United States Patent

Brandstetter et al.

[11] Patent Number: 6,075,893
[45] Date of Patent: Jun. 13, 2000

[54] COMPUTER CONTROLLED OPTICAL SYSTEM FOR ANGULAR ALIGNMENT OF STRUCTURES USING MOIRE PATTERNS

[75] Inventors: Robert W. Brandstetter, Levittown; Nils J. Fonneland, Lake Grove, both of N.Y.

[73] Assignee: Northrop Grumman Corporation, Los Angeles, Calif.

[21] Appl. No.: 08/909,508

[22] Filed: Aug. 12, 1997

Related U.S. Application Data

[60] Division of application No. 08/442,265, May 16, 1995, Pat. No. 5,732,163, which is a continuation-in-part of application No. 08/093,946, Jul. 21, 1993, abandoned, which is a continuation-in-part of application No. 08/212,595, Mar. 11, 1994, abandoned.

[51] Int. Cl.[7] .............................. G06K 9/48; G06K 9/62
[52] U.S. Cl. ........................ 382/199; 382/209; 382/217; 356/374
[58] Field of Search .................................. 382/141, 199, 382/209, 210, 296, 217, 218, 266, 268, 269, 270, 274, 294, 309, 311; 356/374–376; 358/454–457

[56] References Cited

U.S. PATENT DOCUMENTS

| | | | |
|---|---|---|---|
| 3,700,907 | 10/1972 | Myer et al. | 250/219 D |
| 3,945,129 | 3/1976 | Bergkvist | 356/395 |
| 4,525,858 | 7/1985 | Cline et al. | 382/154 |
| 4,642,813 | 2/1987 | Wilder | 382/8 |
| 5,025,476 | 6/1991 | Gould et al. | 356/374 |
| 5,075,562 | 12/1991 | Greivenkamp, Jr. et al. | 356/374 |
| 5,159,474 | 10/1992 | Franke et al. | 382/210 |
| 5,173,946 | 12/1992 | Rao | 382/8 |
| 5,185,883 | 2/1993 | Ianni et al. | 382/8 |
| 5,189,708 | 2/1993 | Cox et al. | 382/8 |
| 5,196,683 | 3/1993 | Marom et al. | 235/462 |
| 5,311,598 | 5/1994 | Bose et al. | 382/8 |
| 5,319,445 | 6/1994 | Fitts | 356/376 |

Primary Examiner—Bhavesh Mehta
Attorney, Agent, or Firm—Terry J. Anderson; Karl J. Hoch, Jr.

[57] ABSTRACT

A computer controlled optical system for angular alignment of structures which uses an optical imaging system input to a computer to synthesize regularly spaced reference and test line patterns replicated from binarized edges taken from the optical images of structures to be aligned. The two patterns are then combined resulting in an interference pattern in which the spacing of moiré fringes indicates the amount of movement of the structures required to bring them to a predetermined alignment. All of the procedures are observable on the interference display. These moiré fringe pattern are a quantitative measure of angular alignment between the reference and test images and of the edges from the structures from which they were taken. An operator programmed and controlled template automatically processes moiré edge alignment measurements. An automatic template processor generates a test sequence template from the chosen areas for measurement by the operator. A template memory module having a library of test sequence templates allows the process to be run without the selection of areas to be measured by the operator. Process imaging and logic operations are utilized in generating the automatic test sequence template.

9 Claims, 4 Drawing Sheets

S/D ≈ TAN Φ ≈ Φ FOR SMALL ANGLES
∴ D ≈ S/Φ AS Φ ⟶ 0

COMPUTER CONTROLLED OPTICAL SYSTEM FOR ANGULAR ALIGNMENT OF STRUCTURES USING MOIRE PATTERNS

This application is a division of application Ser. No. 08/442,265, filed May 16, 1995 now U.S. Pat. No. 5,732,163, for ANGULAR ALIGNMENT OF STRUCTURES USING MOIRE PATTERNS which is a continuation in part of Ser. No. 08/093,946 filed Jul. 21, 1993, now abandoned, ANGULAR ALIGNMENT BY EDGE DIFFRACTION MOIRE PATTERNS and Ser. No. 08/212,595 filed Mar. 11, 1994, now abandonded, AUTOMATIC TEST TEMPLATE SYSTEM.

CROSS REFERENCES TO RELATED APPLICATIONS

Reference is made to the following co-pending applications of which the present application is a continuation in part:

(a) Ser. No. 08/093,946 filed Jul. 21, 1993, now abandoned, entitled "ANGULAR ALIGNMENT BY EDGE DIFFRACTION MOIRÉ PATTERNS" in the name of Robert W. Brandstetter and assigned to Grumman Corporation; and (b) Ser. No. 08/212,595 filed Mar. 11, 1994, now abandoned, entitled "AUTOMATIC TEST TEMPLATE SYSTEM" in the names of Robert W. Brandstetter and Nils J. Fonneland, and assigned to Grumman Corporation.

FIELD OF THE INVENTION

The present invention relates to a computer controlled optical system for angular alignment of structures. More particularly, the invention relates to such a system in which an optical subsystem provides line data (in image form) from the structures to a computer subsystem wherein moiré patterns are generated from the line data to display angular alignment of the structures.

BACKGROUND OF THE INVENTION

In the manufacture of large structures such as aircraft, spacecraft, etc., where precision alignment is needed, it is known to employ optical metrology (including laser range finding and interferometrics) and photogrammetry to determine the angular orientation of assemblies and subassemblies in relation to each other. These processes can take an extended time, even days, to arrive at a result depending on the required precision. Furthermore, these processes have often interfered with work on or near the structure, even requiring that work be stopped during periods in which alignment measurements and alignment changes are made.

There is, therefore, a need for a new and improved system for rapid angular alignment of structures.

OBJECTS OF THE INVENTION

It is a general object of the present invention to provide a method and apparatus for angular alignment of structures which will overcome the above limitations and disadvantages.

It is a further general object of the present invention to provide a system of the above character including an optical subsystem which provides images from the structures from which line date is derived and used in a computer subsystem to generate moiré patterns which are combined in an interference pattern which, when displayed, shows angular alignment.

It is a further general object of the present invention to provide a system of the above character further in which the computer creates a binarized image of selected linear features of the structures from which regularly spaced line patterns are derived which, when superimposed or interfered, create moiré interference patterns in which the fringe spacing is an immediate indication of angular displacement of the structures. The moiré pattern is then observed as the structures are moved into alignment and gives a critical report of the exact, proper alignment.

It is another general object of the invention to provide a system of the above character by which an optical images of linear features of the structures are created, replicated into regularly spaced line patterns and logically combined to give an interference or moiré fringe pattern which is then displayed on a computer screen. The spacing is a measure of the angular misalignment.

If it is desired to obtain a predetermined angle ($\phi \neq 0$) between the linear features of the structures, one pattern is rotated through the predetermined alignment angle by computer manipulation, and that rotated pattern is then combined with the other to form a moiré interference pattern which now translates to a measurement of the amount of misalignment from that predetermined angle. The structures are then angularly shifted into exact alignment to the angle $\phi$ by watching the moiré interference pattern expand to the limit.

It is another general object of the present invention to provide system of the above character for use in doing real time angular alignment of structural subassemblies and final assemblies, independent of x-y translation (shift invariant) of these assemblies.

It is a further object of the present invention to provide an automated system for automatic test sequencing for a multiplicity of specified edges of structures being aligned.

It is another object of the present invention to provide an automated system of the above character capable of using a large library of pre-planned automatic test procedures for moiré alignment of structure.

It is another object of the present invention to provide an automated system which allows the moiré technique to automatically monitor alignment of structures located remotely from the operator.

It is a further object of the present invention to provide an automated system that allows the real time alignment of large surfaces to high precision.

It is still a further object of the invention to provide an automated system whereby the process is not affected by translational errors in the location of the production assembly when the operator originates or places automatic test templates which form part of the invention.

Another object of the invention is to provide an automated system which can be used for precision alignment of parts and assemblies with straight or curved edges.

SUMMARY OF THE INVENTION

The present invention is based on the realization that optically formed, plan view images of the structures can be taken with a camera remotely located from the structures, i.e., above the structures, and delivered as input to a computer programmed to generate, from these optical images, binarized line images from the linear part of the structures that it is desired to align. From these line images, linear repeating patterns of equally spaced parallel lines which follow contours of selected object edges (simulating diffraction patterns) are generated and logically combined for display on a computer screen readout to form real time moiré patterns showing the angular state of alignment between the structures. The computer further is programmed to generate, on demand, an angular shift of one pattern with respect to the other which is selected to be the amount of the desired angular displacement between the structures. Should the structures be aligned to that selected angle, the moiré pattern will so show as an interference pattern having with infinite fringe spacing, while misalignment will show as a plurality of spaced parallel fringes the spacing (or frequency) of which is proportional to the misalignment. The structures can then be aligned until the fringes disappear, or, if solely measurement be sought, the angular displacement from the reference value inputted to the computer can be taken from a count or from the periodicity of the fringes.

As conceived, the edge transform was thought of as a Fraunhoffer edge diffraction pattern that could be modeled using a transform. However, it was quickly determined that the edge transform is not limited to a model or a few specific transform operators. In accordance with this invention it is synthesized by any of a variety of processors or algorithms that satisfy the need to provide a replicated line pattern of equally spaced lines that are exactly parallel to the features (edges) of the structures being aligned.

Thus, the edge alignment concept just stated makes use of two basic principles: (1) each structural feature, i.e., edge, can be transformed to a repetitive pattern of evenly spaced parallel lines (similar to that generated by the classic diffraction pattern of monochromatic light from an edge) and (2) a moiré fringe pattern results when two such repetitive patterns are overlaid (in computer memory).

The apparatus of the invention further provides operator programmed and controlled template for automatic processing of moiré edge alignment measurements.

The apparatus includes a high resolution video camera and a moiré processing computer connected to the video camera. A display is coupled to the moiré processing computer. Automatic template processor is in two-way communication with the moiré processing computer. A light pen or mouse is connected to the automatic template processor and the display and a template memory is in two-way connection to the automatic template processor. An operator uses the light pen or mouse to selectively highlight edge areas for moiré alignment measurements. Alternatively, a predetermined test template sequence can be called up from the template memory. The system then runs through a sequence of processes to produce the selected edges for moiré alignment.

The first sequence of steps serve to produce a processed image from the test image as viewed by the high resolution video camera. In order to produce the processed image, the test image is thresholded, then binarized and then edged with the respective corresponding circuits to produce a processed image.

The second sequence of steps is to produce a display template from the test image. This is achieved by first marking up the test image with the light pen or mouse. The marked up test image is then thresholded and then binarized. After the step of binarizing, the binarized marked up image is inverted to provide a display template.

Upon completion of the aforementioned sequence of steps, the processed image and the display template are combined to produce selected edges for moiré alignment.

These and other features and objects of the invention will now be explained in detail by reference to the following detailed description and claims when taken with the accompanying drawings, of which:

DETAILED DESCRIPTION OF THE PREFERRED EMBODIMENTS

Figure 1:
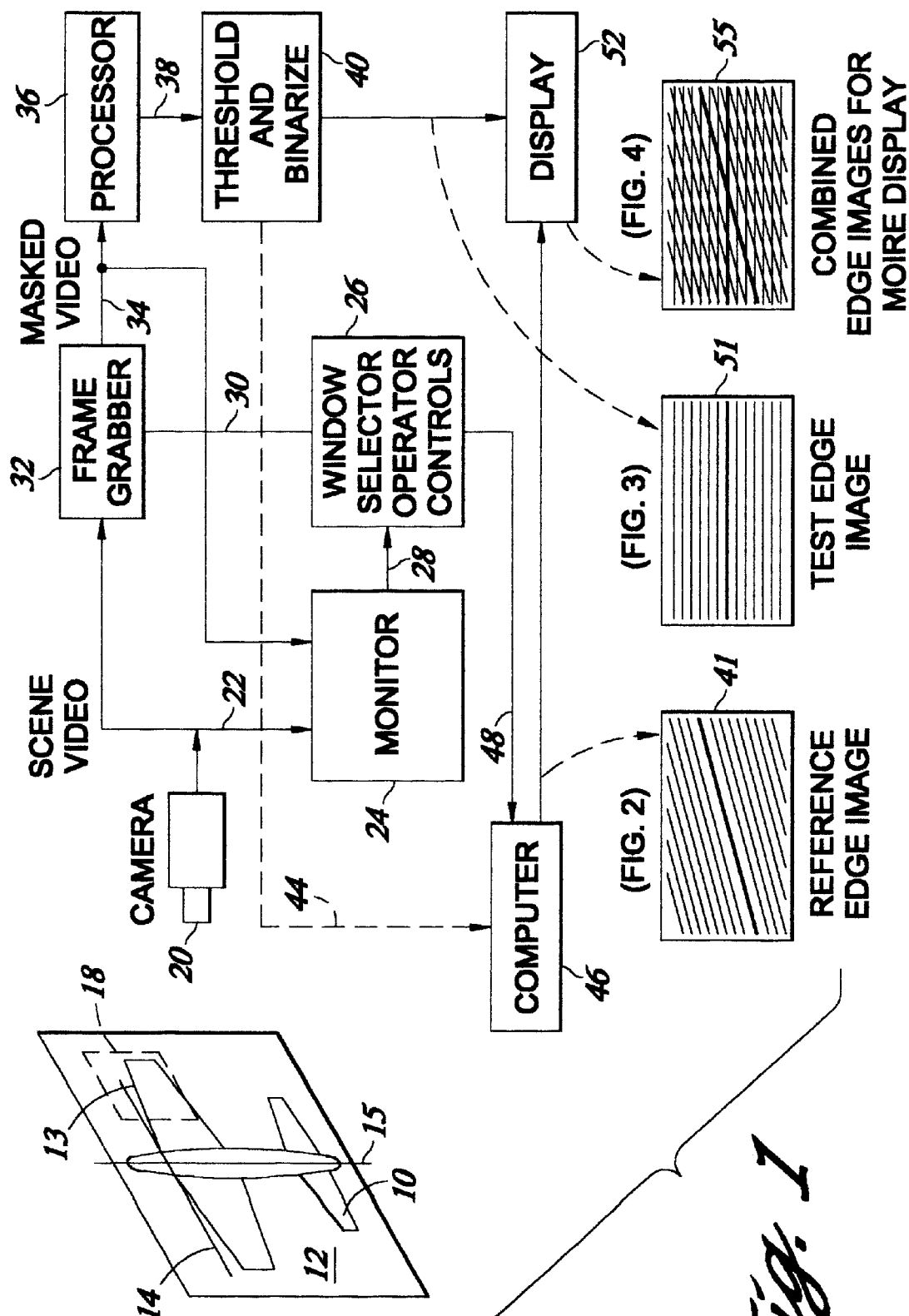
FIG. 1 is a block diagram of the apparatus for angular alignment constructed in accordance with the present invention.

Referring to FIG. 1, there is shown an aircraft 10 as viewed from the top, the aircraft resting on a production floor 12. The present system will be shown to achieve angular alignment of an aircraft surface and/or edge 13 relative to a reference axis, such as a reference line 14 taken from the fuselage centerline 15. In FIG. 1, a window 18 defines a wing edge for which alignment is to be checked relative to a reference line, for example the fuselage reference line 14. By virtue of the present invention, the angle of the wing edge 13 relative to the fuselage reference line may be measured, or during production the wing may be incrementally moved into place relative to the fuselage until a desired alignment is achieved.

The scene is viewed by a video camera 20, preferably of high resolution, such as that manufactured by the Kodak company and marketed as a Videk Megaplus, or, less preferably, one with somewhat lower resolution such as a generic RS170 CCD camera. Typically, the reference line 14 is, for example, a fuselage centerline line rotated through an appropriate angle by a computer program, and, is thereafter replicated in the computer 46 to form an image 41 of a first reference line pattern which is stored and interfered with a second image line pattern 51 replicated from a second aircraft edge 13 so as to form a moiré display indicative of the relative alignment between the inspected edge 13 and the derived reference line 14. Combining patterns 41 and 51 results in a moiré pattern 55 whose fringe spacing D is a direct measure of relative alignment between the derived reference line 14 and the test edge 13.

In order to store the images of the reference line 14 and inspected edge 13, the output from the television camera 20 is input to a commercial frame grabber 32 which captures and processes the video. A cursor-controlled window selector 26 generates control signals for the desired window for inspection, such as a portion of the forward wing edge 16 of aircraft 10—effectively creating a masked video output 34 from the frame grabber. The masked video undergoes a digital transform in a processor 36 or equivalent means. The output 38 of the processor 36 is input to a processor 40 which sets threshold detection to maximize the signal-to-noise ratio of the input signal and also a binarized image. Note that FIG. 1 is meant to present the invention with its various elements as discrete operations, e.g. processor 36, window selector operator controls 26, monitor 24, and display 52.

The functions of the remaining components 32, 36, 40, and 46 could reside in a single processor-computer operating with a custom software package or one with a modified source code such as the NIH application—IMAGE. The images are. visually observed on a display 52. The processor 40 has an additional output path, which is indicated in dotted lines to signify its use during the storage of the reference image. Thus, the reference image is outputted from processor 40 and input 44 to a computer 46 or other memory medium. The window selector 26 establishes location data for the reference edge image so that various reference edges or surfaces may be addressed by corresponding windows relative to the aircraft 10. Window selection of the stored image occurs along control input 48 to the computer 46.

Although the preceding discussion indicates a utilization of a visually input reference, it is possible to store such a reference from simulation models.

Once the reference is stored, the television camera 20 is directed from a top plan view to generate scene video data of successive aircraft being produced. The output from television camera 20 is observed on a monitor 24 connected thereto by wire 22. The scene video of the production aircraft is also input to the frame grabber 32. The window selector 26 is appropriately operated, either manually or by computer control, to generate an observation window of a particular edge undergoing inspection which, for the purpose of this illustration, will be the edge 13 of the forward wing of the aircraft 10. The output 34 from the frame grabber 32 represents masked video of this edge portion which is input to the transform processor 36 that accomplishes an edge transformation. The transformed data is then input to the processor 40, connected by wire 38 to the processor 36. This results in the generation of a test edge image.

At the bottom of FIG. 1, reference numeral 41 indicates a typical reference edge image which has been pre-stored. The image of the test edge portion 16 is indicated by reference numeral 51. The gist of the present invention is that, by combining the reference edge and test edge images 41 and 51, a combined edge moiré display may be created on display 52 by logically ORing the two images on the display 52. The moiré display provides visual information as to the angle between the test edge and the reference edge. This will be explained in greater detail below.

Figure 2:
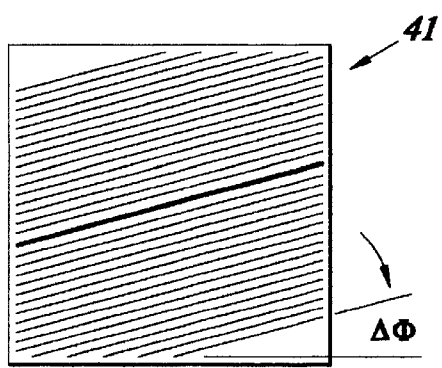
FIG. 2 is a reference image as developed by the apparatus of FIG. 1.
Figure 3:
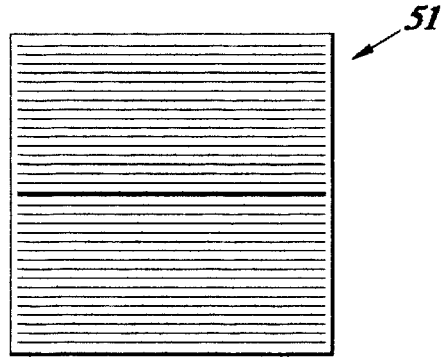
FIG. 3 is a test image as developed by the apparatus of FIG. 1.

FIGS. 2 and 3 indicate typical reference and test images, respectively, resulting from displays making the angle $\phi$ to each other.

Figure 4:
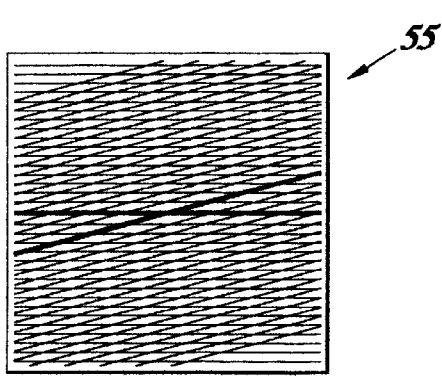
FIG. 4 is a moiré pattern from combined reference and test images as generated in the video display of the apparatus of FIG. 1.

FIG. 4 is an enlarged illustration of a moiré interference pattern produced by combining reference and test images of FIGS. 2 and 3.

As a practical example, the system used in tests of this invention employs binarized edge replication to obtain edge transforms. The selected images of the reference and test objects are in this way transformed and overlaid to obtain in situ alignment of component parts during assembly. This is accomplished by logically summing, in a computer memory, the two transformed images to produce a moiré alignment pattern. The moiré fringes are then analyzed to obtain a quantitative measure of angular alignment between the reference and test images.

Such edge replication is accomplished in image processor means provided fo transforming the edge or one into a replicated pattern of equally spaced parallel contour lines The processor consists of a suitable transform processor which takes the single binarized line representing an edge and forms a series of pixel addresses representing each of a plurality of equally spaced points through which each line must pass. The binarized edge then replicated to form an array of equally spaced parallel lines parallel to the binarized edge to develop the pattern shown in FIGS. 3 and 4. In one application, the above processor was implemented with a application macro within the NIH Image software program and could be executed in less than half a minute.

FIGS. 2 and 3 show two simulated edge transform patterns so derived from a fuselage center line (reference) and leading wing edge (test) and the formation of a corresponding moiré pattern. The spacings for each pattern can be the same value or can differ, depending upon the scale of the transforms. For this example, the spacings have been set equal to provide a basic representation of moiré effect.

Note that these fringe patterns would exactly parallel the physical edges of the fuselage and wing sections. The angular difference between the test and reference transforms is given by the angle $\phi$. As the two edge patterns come close to alignment, $\phi$ becomes quite small, and the moiré fringe width D becomes correspondingly larger. In effect, small misalignments are magnified by the large moiré fringe spacing, thus providing sensitivity in the measurement where it is needed.

Figure 6:
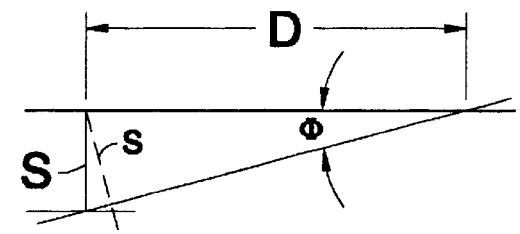
FIG. 6 is a sketch showing angular relationships of the moiré interference pattern of FIG. 5.
Figure 5:
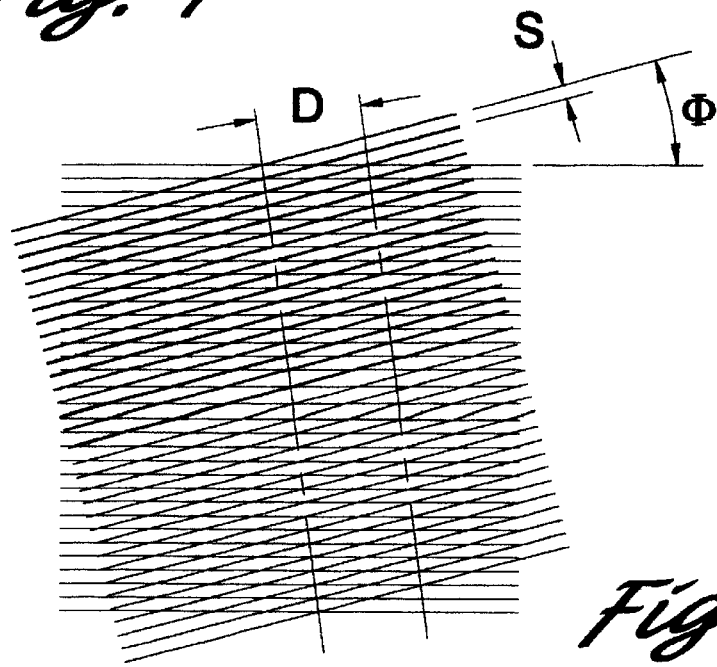
FIG. 5 is an enlarged portion of the moiré interference pattern of FIG. 4.

In order to understand the alignment geometry in greater detail, reference is made to FIGS. 5 and 6. This is a simplified geometric view of the overlapping test and reference images as shown in FIG. 4.

D is equal to the moiré fringe spacing while S is the spacing between replicated lines, which, for this analysis, is assumed to be the same for each pattern. The angle $\phi$ is the angle between test and reference fringe patterns as well as the angle between the test edge 13 and the derived reference line 14. A greatly simplified analysis shows the trigonometric relationship between these quantities is, for small $\phi$:

$$S/D \approx \tan \phi$$

which, for small $\phi$, can be shown to be satisfactorily approximated by:

$$S/D \approx \phi, \text{ for small angles.}$$

Solving for D, one finds:

$$D \approx S/\phi.$$

A detailed analysis yields the same result.

From these trigonometric relationships, it is seen that as alignment is approached between the structures, as seen in the reference and test images, the angle $\phi$ goes to zero, and the moiré fringe spacing D gets larger without limit, and at maximum alignment accuracy, D becomes and exceeds the width of the display. The effective magnification of this alignment is the ratio $S/\phi$ which becomes quite large as alignment is achieved (i.e., $\phi \rightarrow 0$).

It should be noted that in the above discussion the fuselage reference line was relied upon as the reference edge for establishing a reference edge image, but any edge or surface of the aircraft may serve the same purpose. It is also to be emphasized that, although the present invention is discussed in connection with checking alignment of production aircraft, the invention may be extended generally to checking alignment between various linear formations of any structure (e.g. painted stripes, joints, borders, etc.). Further, it should be noted that he number and shapes of a structure's edge can vary in curvature and that line curves can be substituted for the straight curves shown.

The system of FIG. 1, as shown, will produce one measure per operation. Thus, in order to perform this operation for a multiple test sequence of such operations, operator must manually and individually select each moiré processing operation upon completion of the last.

Automated System

Figure 7:
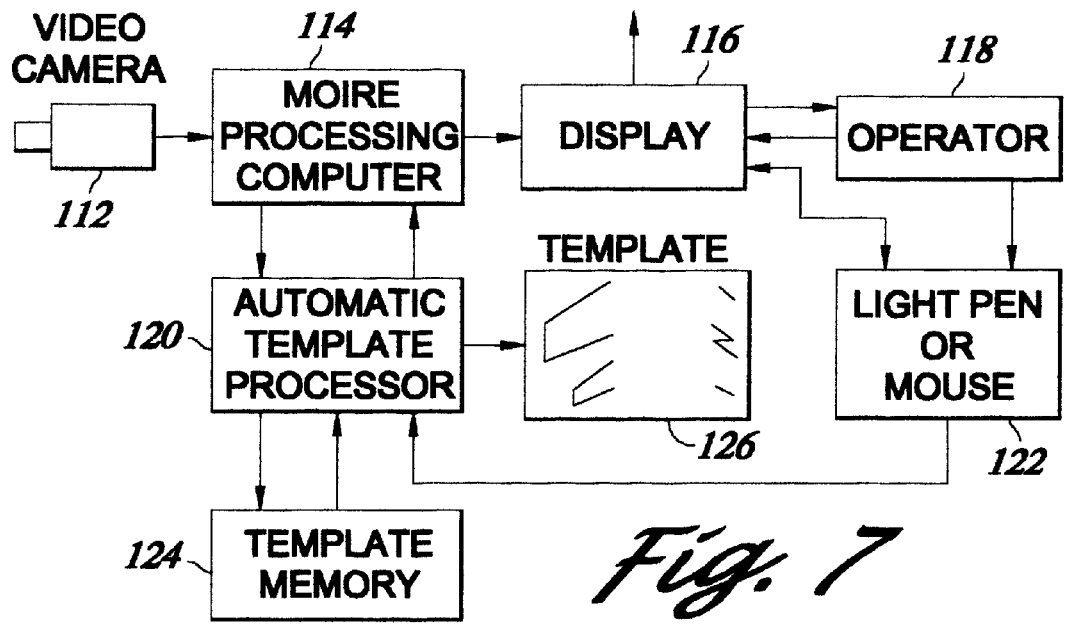
FIG. 7 is a block diagram of a second apparatus adapted for automated test template use and constructed in accordance with the present invention.

FIG. 7 shows a block diagram of a second embodiment of the invention designed to automate this task, i.e., an automatic test template system. In addition to the elements camera 112, computer 114, and display 116 also shown in FIG. 1, automatic template operations have been added. An automatic template processor 120 is in two-way communication with moiré processing computer 114 and template memory module 124. Automatic template processor 120 outputs a template 126 that is either prescribed by operator 118 on line, or can be called up from a test library contained in template memory module 124. Operator 118 can prescribe template 126 by using light pen/mouse 122. Light pen/mouse 122 is connected to automatic template processor 120 and is used by operator 18 to highlight the areas where edges are to be measured on display 116. Once this plan is complete, the system can then be instructed to automatically sequence through the area edges designated. The results can subsequently be viewed by operator 118 on display 116 and/or be printed out as a documented test for the measurements prescribed by said operator and as automated by template 126.

The automatic test template architecture employs image processing and logic operations to isolate and identify selected edges that can then be transferred to the moiré edge alignment system for moiré alignment operations.

Figure 8:
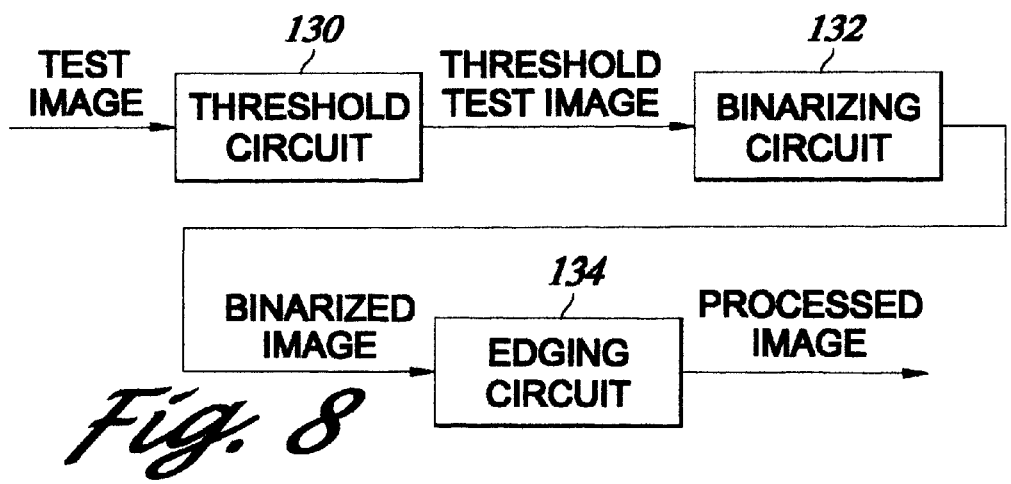
FIG. 8 is a diagram of a basic first process of the present invention.

FIG. 8 shows the basic image processing operation. A test image, as viewed by the high resolution video camera 112, shown in FIGS. 1 and 7, is thresholded by threshold circuit 130, of any suitable known type. The thresholded test image is then binarized by binarizing circuit 132 of any suitable known type. Binarizing of the thresholded test image sets all levels below the threshold to zeros and those above the threshold level to ones. The binarized image is then edged by edging circuit 134, of any suitable known type, to produce a processed image. Edging circuit 134 can be a form of a high pass filtering circuit, or other suitable processing means. Stated mathematically, where the image is two-dimensional, with z denoting the intensity or video level:

$$PI(x,y)=I(x,y,z) \text{ Thld}(z) \text{ [BIN] [EDGE}$$

where PI(x,y)=the processed image, I(x,y,z)=the test image, Thld(z)=threshold operation, BIN=binarize operation and EDGE=edge operation.

The processed image, PI(x,y), is then ready to be operated on by the automatic template. The template is given, mathematically, by:

$$T(x,y)=NOT [I(x,y,z) \cdot LP(x,y) \cdot Thld(z) \text{ BIN}]$$

where T(x,y)=display template field, I(x,y,z)=test image and LP(x,y)=light pen markup.

Figure 9:
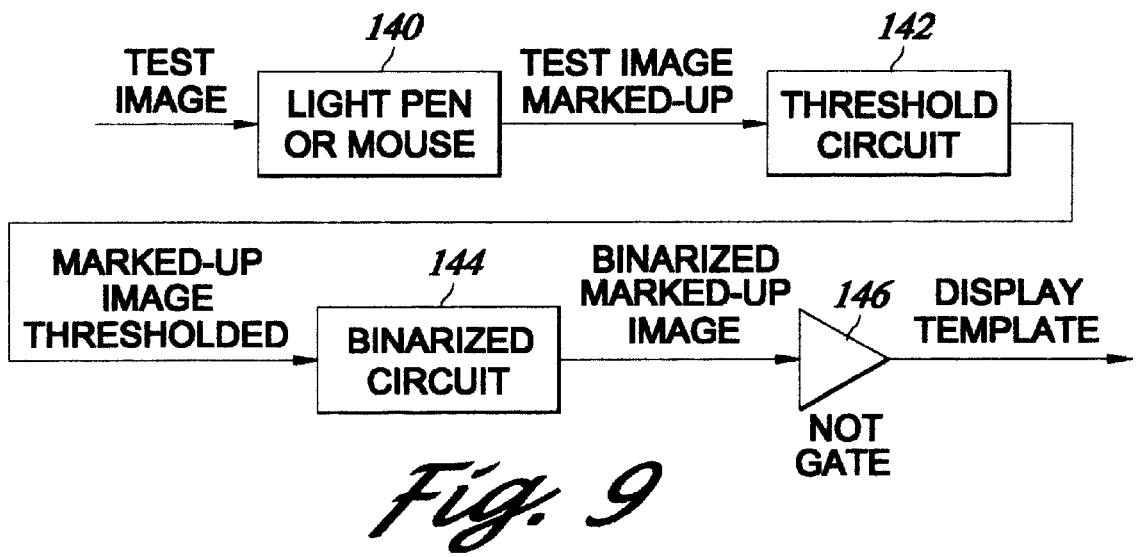
FIG. 9 is a diagram of a second process according to the invention.
Figure 10:
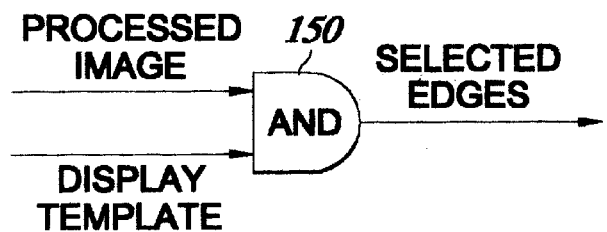
FIG. 10 is a diagram of a third process according to the invention.

FIG. 9 shows the operation of producing a display template field. The operator, using a light pen markers up the test image. That is, the operator highlights the selected areas for measurement using a device 140. Device 140 can be either a light pen, or the like. Once the test image is marked up, the marked up image is thresholded by threshold circuit 142, of any suitable known type. The marked up image thresholded is then binarized by binarizing circuit 144, of any suitable known type. The binarized marked up image is then inverted by NOT gate 146, of any suitable known type, to produce the template field of the display template.

The results of the operations shown in FIGS. 8 and 9 are combined, via AND gate 150, shown in FIG. 5, to obtain the selected edges for alignment. Stated mathematically:

$$SE(x,y)=PI(x,y) \cdot T(x,y)$$

where SE(s,y)=the selected edges and PI(x,y)=the processed image obtained in FIG. 8 and T(x,y)=the display template field obtained in FIG. 9.

Under changing conditions, and when new structures are placed under test, a new template can be made. When it is required that existing test modules be used from memory, the operator would be able to rotate and translate these templates first to nominally align them with reference points on the structure after which the test would proceed as previously described.

Application to Aircraft Alignment

The aircraft assembly under test is viewed by a TV camera mounted at the ceiling of the manufacturing facility to obtain an overhead view of the station where the structures are in final assembly, say, for example the wing to the fuselage.

To initialize the system, the operator selects the desired airplane reference surfaces and/or edges from the display console. Views of the airplane are then imaged by the TV camera and digitally stored in a resident computer on hard disk, RAM, or other suitable memory. The operator can select and isolate different sections of the aircraft for the purpose of checking and aligning these subassemblies, as required.

The imaging system can be aligned along any prescribed axis such as the FRL or transverse axes of the aircraft. The selected images are viewed by the operator on the console monitor where programmable cursors, fiducial markers, and numerical readouts are provided to perform the moiré measurements. The operator selects the test edge by placing a window over the area of interest. The windowed image is then thresholded, setting it above the noise level to extract a clean image that is then binarized and edge transformed.

The corresponding area of the selected reference image is processed in the same way, producing an edge transform pattern. The two edge-transformed images are then combined on the console display forming a moiré pattern like that shown previously in FIG. 1. As the alignment process proceeds, the test surface orientation is adjusted and the moiré pattern changes. The operator will be able to conclude the alignment for that surface when the moiré fringe spacing fills the entire display or when it reaches a predetermined alignment width.

While several embodiments of the present invention have been shown and described, it is to be understood that many changes and modifications may be made thereunto without departing from the spirit and scope of the invention as defined in the appended claims.

What is claimed is:

1. An apparatus for an operator programmed and controlled template for automatic processing of moire edge alignment measurements using a high resolution video camera, an moire processing computer coupled to the high resolution video camera and a display operative to generate a test image, an operator being in two way communication with the display, the apparatus comprising:

an automatic template processor in two way communication with the moire processing computer, said automatic template processor being operative to generate a test sequence template indicative of a selected test sequence by thresholding, binarizing, and edging the test image to produce a processed image, identifying and isolating selected edge areas of the processed image, generating a template field from said selected edge areas to be measured, and applying said processed image to said template field to generate said test sequence template;

means for selecting said test sequence, said selecting means being electrically connected to the automatic template processor; and a template memory module in two way communication with said automatic template processor, said template memory module being operative to store the test sequence template.

2. The apparatus as claimed in claim 1, wherein said selecting means is prescribed by the operator.

3. The apparatus as claimed in claim 2, further comprising a light pen connected to said automatic template processor, and wherein the operator selects the test sequence using the light pen, said operator using said light pen to highlight areas where edges are to be measured in the test sequence on the display.

4. The apparatus as claimed in claim 2, further comprising a mouse connected to said automatic template processor, and wherein the operator selects the test sequence using the mouse, said operator using said mouse to highlight areas where edges are to be measured in a test sequence on the display.

5. A method of producing a test sequence template for automatic processing of moire edge alignment, the method comprising the steps of:

thresholding a test image to produce a thresholded test image;

binarizing said thresholded test image to produce a binarized image;

edging said binarized image to produce a processed image;

identifying and isolating selected edge areas of the processed image;

generating a test sequence template of said selected edge areas to be measured, said test sequence template being a template field; and applying said processed image to said template field.

6. The method as claimed in claim 5, wherein said step of generating a test sequence includes the step of highlighting the selected edges by using a light pen on a display.

7. The method as claimed in claim 5, wherein said step for generating a test sequence template includes the step of highlighting the selected edges by using a mouse in conjunction with a display.

8. The method as claimed in claim 5, wherein said step of generating a test sequence template further comprises the steps of:

marking test areas by highlighting them on a display to produce a marked image;

thresholding said marked image to produce a marked up image thresholded;

binarizing said marked up image thresholded to produce a binarized image; and inverting said binarized image to produce a template field.

9. The method as claimed in claim 5, wherein said step of applying said processed image to said automatic template field comprises the step of:

combining said template field with said processed image to provide selected edges for moiré edge alignment.

\* \* \* \* \*